(12) United States Patent
Yang et al.

(10) Patent No.: US 11,587,122 B2
(45) Date of Patent: Feb. 21, 2023

(54) SYSTEM AND METHOD FOR INTERACTIVE PERCEPTION AND CONTENT PRESENTATION

(71) Applicants: Beijing Jingdong Shangke Information Technology Co., Ltd., Beijing (CN); JD.com American Technologies Corporation, Mountain View, CA (US)

(72) Inventors: I-Hsuan Yang, Mountain View, CA (US); Hsien-Ting Cheng, Mountain View, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

( * ) Notice: Subject to any disclaimer, the term of this patent is extended or adjusted under 35 U.S.C. 154(b) by 118 days.

(21) Appl. No.: 16/697,031

(22) Filed: Nov. 26, 2019

(65) Prior Publication Data
US 2021/0158399 A1 May 27, 2021

(51) Int. Cl.
*G06Q 30/02* (2012.01)
*G06Q 30/0251* (2023.01)
(Continued)

(52) U.S. Cl.
CPC ......... *G06Q 30/0269* (2013.01); *G06F 3/013* (2013.01); *G06V 20/53* (2022.01);
(Continued)

(58) Field of Classification Search
CPC .................................................. G06Q 30/0269
See application file for complete search history.

(56) References Cited

U.S. PATENT DOCUMENTS 6,708,176 B2  3/2004  Strunk et al.
9,516,470 B1 * 12/2016  Scofield ............. G01C 21/3697
(Continued)

FOREIGN PATENT DOCUMENTS

CN   206532332 U   9/2017
CN   107507017 A   12/2017
(Continued)

OTHER PUBLICATIONS

PCT/CN2020/131868 The International Search Report and the Written Opinion, dated Feb. 25, 2021.

*Primary Examiner* — Scott C Anderson
(74) *Attorney, Agent, or Firm* — Scully, Scott, Murphy & Presser, P.C.

(57) ABSTRACT

A method and system for content display. The method includes: capturing, by an imaging device, a plurality of images of an environment; generating, by a computing device, first user profiles based on appearance of users recognized in the images; detecting devices in the environment and associating the detected devices to the users to obtain associated devices that are held by the users; retrieving, by the computing device, second user profiles of the users based on identifications of the associated devices; selecting at least one content based on the first user profiles and the second user profiles; and displaying the at least one selected content.

18 Claims, 5 Drawing Sheets

(51) Int. Cl.
*H04L 67/306* (2022.01)
*G06F 3/01* (2006.01)
*G06V 20/52* (2022.01)
*G06V 40/18* (2022.01)
*G06V 40/16* (2022.01)

(52) U.S. Cl.
CPC ............ *G06V 40/165* (2022.01); *G06V 40/18* (2022.01); *H04L 67/306* (2013.01)

(56) References Cited

U.S. PATENT DOCUMENTS

| | | | |
|---|---|---|---|
| 10,303,187 B1* | 5/2019 | McNamara | G06Q 10/087 |
| 2005/0253774 A1 | 11/2005 | Choi | |
| 2011/0288913 A1 | 11/2011 | Waylonis et al. | |
| 2013/0331147 A1* | 12/2013 | Chang | H04W 4/18 |
| | | | 455/556.1 |
| 2014/0122220 A1* | 5/2014 | Bradley | G06Q 30/0267 |
| | | | 705/14.42 |
| 2014/0195328 A1* | 7/2014 | Ferens | G06Q 30/0271 |
| | | | 705/14.41 |
| 2015/0019373 A1 | 1/2015 | Carbonell et al. | |
| 2018/0032997 A1* | 2/2018 | Gordon | G06Q 30/0269 |
| 2018/0204111 A1* | 7/2018 | Zadeh | G06N 3/0436 |
| 2019/0272691 A1* | 9/2019 | Nye | G07C 9/38 |
| 2019/0340449 A1* | 11/2019 | Kench | G06T 7/70 |
| 2019/0385197 A1* | 12/2019 | Seneewongs | G06Q 30/0277 |

FOREIGN PATENT DOCUMENTS

| | | |
|---|---|---|
| CN | 108460622 A | 8/2018 |
| CN | 109271914 A | 1/2019 |
| CN | 109447714 A | 3/2019 |
| CN | 110033293 A | 7/2019 |

* cited by examiner

|        | Ads 1 | Ads 2 | Ads 3 | Ads 4 |
|--------|-------|-------|-------|-------|
| User 1 | 0.1   | 0.2   | 0.3   | 0.4   |
| User 2 | 0.4   | 0.3   | 0.2   | 0.1   |
| User 3 | 0.7   | 0.1   | 0.15  | 0.3   |

SYSTEM AND METHOD FOR INTERACTIVE PERCEPTION AND CONTENT PRESENTATION

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to demographic perception and content presentation, and more particularly to system and methods for recognizing potential customers in an environment through interactive multiple perception and providing advertisement targeting the potential customers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

E-commerce has been a significant part of social life. E-commerce platforms often provide membership systems, collecting profiles of users, and provided users with targeted products and services based on the collected profiles. In contrast, an offline advertisement uses a display to display the products or service, but cannot takes advantage of user information.

Therefore, a demand exists in the art to address the aforementioned deficiencies and inadequacies.

SUMMARY

In certain aspects, the present disclosure relates to a method for content display. In certain embodiments, the method includes:

capturing, by an imaging device, a plurality of images of an environment;

generating, by a computing device, first user profiles based on appearance of users recognized in the images;

detecting devices in the environment and associating the detected devices to the users to obtain associated devices that are held by the users;

retrieving, by the computing device, second user profiles of the users based on identifications of the associated devices;

selecting, by the computing device, at least one content based on the first user profiles and the second user profiles; and displaying the at least one selected content.

In certain embodiments, the step of generating the first user profile includes: extracting eye tracking features of the users from the images; and determining the users' interest based on the eye tracking features, where the step of selecting the at least one content is based on the user's interest. In certain embodiments, the eye features include locations of eyes, directions the eyes are aiming toward, and objects the eyes are looking at.

In certain embodiments, the appearance of each of the users includes at least one of: face feature, eye tracking feature, gender, dress feature, pose, and trajectory of the users. In certain embodiments, the face feature includes locations of faces in the images and characters of the faces; the eye tracking feature includes locations of eyes, directions the eyes are aiming toward, and objects the eyes are looking at; the gender includes male and female; the dress feature includes dress type and dress color; the pose includes the users' status of walking, running and standing; and the trajectory includes current locations and predicted future locations of the users.

In certain embodiments, the step of retrieving the second user profiles of the users includes: matching identification of the associated devices to identification of devices recorded in online profiles of the users in a database to obtain matched devices; and retrieving the online profiles of users corresponding to the matched devices, where the retrieved online profiles are the second user profiles.

In certain embodiments, the method further includes, before the step of associating the detected devices to the users: filtering out the detected devices that are stationary or move in a regular pattern.

In certain embodiments, the first user profiles includes current locations and predicted future locations of the users based on the images. In certain embodiments, the step of selecting at least one content includes: integrating the first user profiles and the second user profiles to obtain integrated user profiles; calculating a relevance score between each of a plurality of contents and each of the users; and choosing the at least one content from the plurality of contents based on the relevance scores and the future locations of the users to obtain the selected at least one content.

In certain embodiments, each of the users is assigned with a user face identification (ID).

In certain embodiments, the method further includes detecting locations of the users in the environment using at least one of a light detection and ranging (LIDAR) device and a radar.

In certain aspects, the present disclosure relates to a system for content recommendation. In certain embodiments, the system includes a computing device, the computing device has a processor and a storage device storing computer executable code. The computer executable code, when executed at the processor, is configured to perform the method described above.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION

Figure 1:
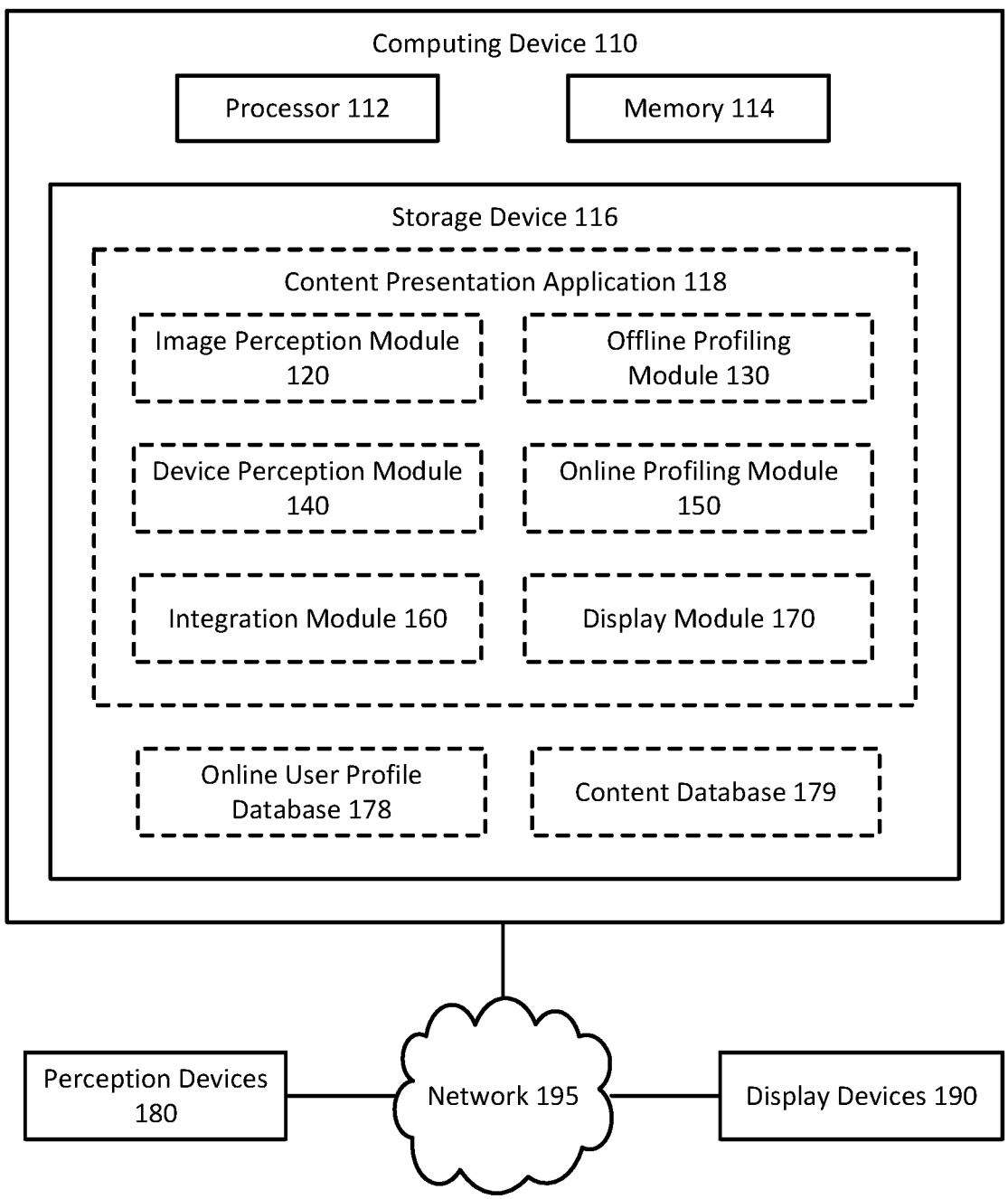
FIG. 1 schematically depicts system for environment perception and content presentation according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure. As used herein, the term "and/or" includes any and all combinations of one or more of the associated listed items.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Offline marketing strategies utilize offline media channels to create awareness of a company's products and services. These campaigns includes billboards, signs and pamphlets, telemarketing, and television ads. However, these offline campaigns don't use online techniques, or so-called user targeting algorithms. To improve offline content presentation, the present disclosure provides a system that utilizes both offline perception technique and online data integration technique.

In certain embodiments, the present disclosure firstly uses the perception systems to probe all the people around—where are they, what are they doing, how do they feel. Secondly, the disclosure matches identification of the people with their online behavior: who are they and what are their interests. A people's trajectory prediction technology will be applied to predict the customers' distribution over the next period of time. Lastly, the disclosure shows advertisements according to the majority of audience in the prediction. By the above procedure, the present disclosure brings the online re-targeting skill to offline system.

FIG. 1 schematically depicts a system for content recommendation and display according to certain embodiments of the present disclosure. As shown in FIG. 1, the system 100 includes a computing device 110, perception devices 180, display devices 190, and a network 195. The computing device 110, the perception devices 180, and the display devices 190 communicate with each other through the network 195. In certain embodiments, the computing device 110 shown in FIG. 1 may be a server computer, a cluster, a cloud computer, a general-purpose computer, a headless computer, or a specialized computer, which provides pose tracking services. The computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In certain embodiments, the computing device 110 may have more than one CPU as the processor, such as two CPUs, four CPUs, eight CPUs, or any suitable number of CPUs. The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114. In certain embodiments, the computing device 114 may further include graphics card to assist the processor 112 and the memory 114 with image processing and display. The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110. In this embodiments, the processor 112, the memory 114, the storage device 116 are component of the computing device 110, such as a server computing device. In other embodiments, the computing device 110 may be a distributed computing device and the processor 112, the memory 114 and the storage device 116 are shared resources from multiple computers in a pre-defined area.

The storage device 116 includes, among other things, a content presentation application 118, an online user profile database 178, and a content database 179. In certain embodiments, the storage device 116 may include other applications or modules necessary for the operation of the content presentation application 118. The content presentation application 118 includes an image perception module 120, an offline profiling module 130, a device perception module 140, an online profiling module 150, an integration module 160, and a display module 170. It should be noted that the modules 120, 130, 140, 150, 160 and 170 are each implemented by computer executable codes or instructions, or data table or databases, which collectively forms one application. In certain embodiments, each of the modules may further include sub-modules. Alternatively, some of the modules may be combined as one stack. In certain embodiments, certain modules may be implemented as a circuit instead of executable code. In certain embodiments, certain modules may be implemented using internet of things (IoT) technique. In certain embodiments, the content presentation application 118 may include other components not shown in FIG. 1. In certain embodiments, the content presentation application 118 further includes a user interface for the user to monitor and adjust parameters for the content presentation application 118, and/or a scheduler to manage the images and device identifications to be processed by different modules of the content presentation application 118, and/or user database storing online behavior of the users.

Figure 2A:
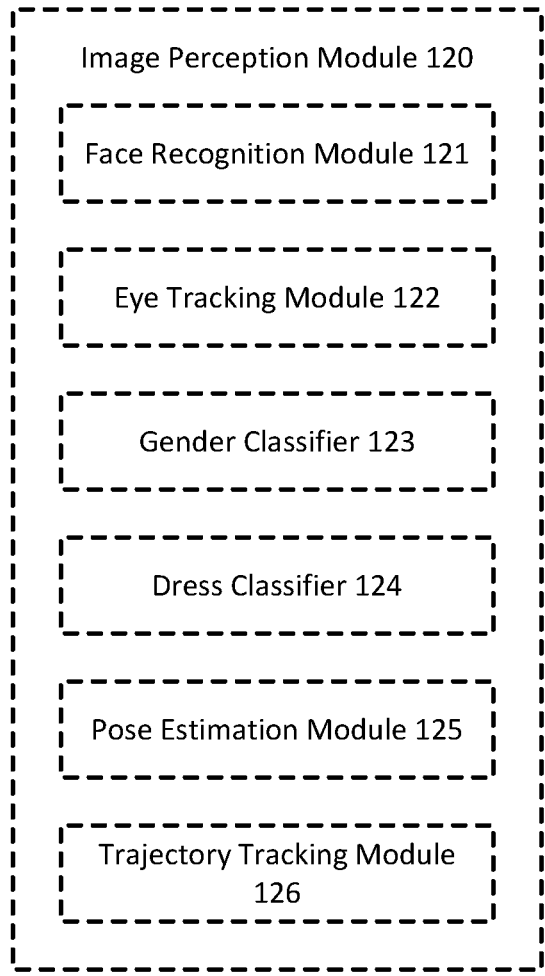
FIG. 2A schematically depicts an image perception module according to certain embodiments of the present disclosure.
Figure 3:
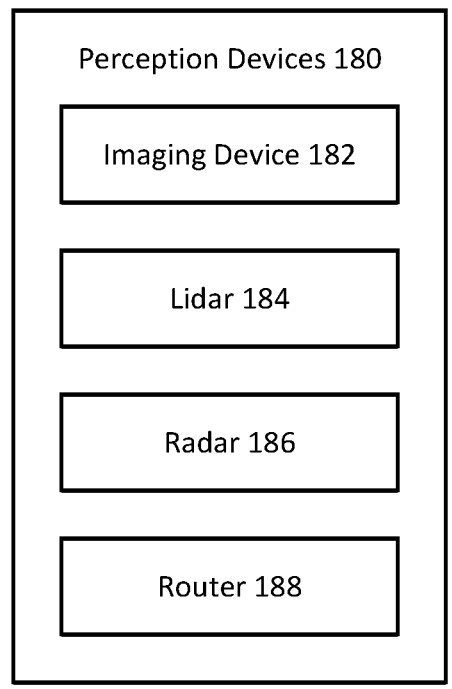
FIG. 3 schematically depicts perception devices according to certain embodiments of the present disclosure.

The image perception module 120 is configured to, upon receiving a video or images from an imaging device 182 as shown in FIG. 3, process the images and send the processing result to the offline profiling module 130, the device perception module 140, and the integration module 160. As shown in FIG. 2A, the image perception module 120 includes a face recognition module 121, an eye tracking module 122, a gender classifier 123, a dress classifier 124, a pose estimation module 125, and a trajectory tracking module 126. In certain embodiments, the modules 121-126 may be performed independently from each other to obtain their respective purpose. In certain embodiments, the module 126 may be performed after performing the pose estimation module 125 such that the poses of the people (potential customers) in the video can be used to determine their current and future locations. In certain embodiments, the modules 121-126 may share certain parameters or intermediate results to facilitate processing speed or processing accuracy of their tasks. In certain embodiments, the image perception module 120 may not include all the modules 121-126. In certain embodiments, some of the module 121-126 may be combined.

The face recognition module 121 is configured to, upon receiving the video, recognize people's faces in the video, assign a face ID for each of the recognized faces, extract feature for each recognized face, and send the face ID, the locations of the faces in the video frames, and the face features to the offline profiling module 130, the device perception module 140, and the integration module 160. In certain embodiments, the face recognition module 121 is configured to use machine learning to obtain the face IDs, the face features, and face locations. In certain embodiments, a confidence score is determined for each of the locations and the face features, which measures confidence of the result. A shopping area, such as a mall, often has cameras from above or at certain height, and thus face information is generally available in the video. By using faces instead of a whole human body, the face recognition module 121 can extract individuals' information and identify individuals more accurately and efficiently. In certain embodiments, the face recognition module 121 is configured to send the output to the modules 122-126, so that the modules 122-126 can at least link their corresponding results to the face IDs assigned by the face recognition module 121.

The eye tracking module 122 is configured to, upon receiving the video from the imaging device 182 and optionally the face recognition result from the face recognition module 121, track eyes of the people (with face ID) in the video, and send the tracking result to the offline profiling module 130, the device perception module 140, and the integration module 160. The tracking result may include location of the eyes in the video frames, directions the eyes are aiming, and objects the eyes are looking at, and the tracking result is linked to the face IDs. The eye tracking may be performed independently from the performance of the face recognition module 121, or may be performed based on the face ID, face features and face locations. In certain embodiments, the eye tracking module 122 is configured to use one or more high resolution videos for eye tracking, while the face recognition module 121 may use one or more videos at a lower resolution for face recognition. In certain embodiments, the eye tracking module 122 is configured to use machine learning to realize eye tracking. In certain embodiments, we may instruct people to walk in a shopping area, looking at advertisement on display, record the video, and label the video accordingly so as to train the machine learning model accurately. In certain embodiments, a confidence score is determined for each of the eyes locations, eyes directions, and objects the eyes are looking at, which measures confidence of the result. In certain embodiments, when the eyes of a person are looking at a specific products or ads, the present disclosure may record it as a strong indication of the person's interest.

The gender classifier 123 is configured to, upon receiving the video and optionally the face recognition result, classify gender for the people observed in the video based on their appearance, and send the classified gender to the offline profiling module 130, the device perception module 140, and the integration module 160. In certain embodiments, the gender is linked to the face IDs. In certain embodiments, the gender classifier 123 is a machine learning model. The machine learning model is trained using labeled images or videos in advance. After the gender classifier 123 is well trained, it can be used to analyze the video frames captured by the imaging device 182, and provide gender for people in the video. In certain embodiments, a confidential score is determined to the assigned gender for each person.

The dress classifier 124 is configured to, upon receiving the video and optionally the face recognition result, classify dress of the people in the video based on the people's appearance, and send the classified dress information to the offline profiling module 130, the device perception module 140, and the integration module 160. In certain embodiments, the dress classifications are linked to the face IDs. The dress information includes, among other things, dress category, dress color, and dress style. The dress category is the type of dress, and includes, for example, skirt, pant, coat, etc. The dress color includes whether the dress's color is light or dark, and the real color of the dressing such as red, blue, yellow, black. The dress style may be inferred from the combination of dresses a person wears, and includes casual style, business style, contemporary style. In certain embodiments, the dress information further includes material of the dress, and the material may include one or more of cotton, wool, silk, leather, nylon, polyesters, spandex, etc. In certain embodiments, the dress classifier 124 is a machine learning model. The machine learning model is trained using labeled images or videos in advance. After the dress classifier 124 is well trained, it can be used to analyze the video captured by the imaging device 182, and provide dress information for people in the video. In certain embodiments, a confidential score is determined for dress type, dress color, and dress style.

The pose estimation module 125 is configured to, upon receiving the video and optionally the face recognition result, estimate poses of the people observed in the video, user's moving intention and moving speed, and send the result to the trajectory tracking module 126, the offline profiling module 130, the device perception module 140, and the integration module 160. In certain embodiments, the results are linked to the face IDs. In certain embodiments, the pose estimation module 125 is a machine learning model, and a confidence score is determined for the estimated poses and moving directions. The machine learning model is trained using labeled images or videos in advance, and. After the pose estimation module 125 is well trained, it can be used to analyze the video captured by the imaging device 182, and provide pose for people in the video. In certain embodiments, the pose estimation module 125 is configured to define a bounding box enclosing each person in a video frame, and estimate poses of a person based on multiple sequential video frames. The estimated poses may include whether the person is standing, is walking, or is running at a time point. Further, the walking or running direction and speed can also be inferred from the sequential videos. Even if a person is standing, his facing direction may be obtained to indicate an intent of a potential walking direction. In certain embodiments, a confidential score is determined to pose status of a person, moving direction of the person, and moving speed for the person. In certain embodiments, the pose estimation module 125 is configured to not only use the captured RGB or black and white video frames, but also depth images from light detection and ranging (LIDAR) or Radar.

The trajectory tracking module 126 is configured to, upon receiving the video, the estimated poses, moving direction, and moving speed, map people's location from video to 2D coordination, such as a 2D map, predict one or more future locations of the people, and send the current and future locations to the offline profiling module 130, the device perception module 140, and the integration module 160. In certain embodiments, the trajectory tracking module 126 may receive or construct a 2D floor map of the environment with reference points, and based on recognition of those reference points in the video, map the locations of the people into the 2D map. In certain embodiments, each person is linked to a corresponding face ID. In certain embodiments, the trajectory tracking module 126 may also be a machine learning model, and a confidence score is determined for the current location and future locations of the people. With a person's status of standing, walking, or running, the moving (walking or running) direction and optionally facing direction, and the moving speed, a prediction on where the person will be located in the 2D map after a predetermined time can be made. The predetermined time may range from a few seconds to ten minutes. In certain embodiments, the predetermined time is from five seconds to three minutes. In certain embodiments, the predetermined time is 30 seconds. In certain embodiments, the trajectory tracking module 126 may also provide several predictions at different future time points, such as after 10 seconds, after half a minutes, after 10 minutes. In certain embodiments, the trajectory tracking module 126 may also provide a range a person will be located in in the next time period, such as the next 10 minutes.

In certain embodiments, each of the modules 121-126 are machine learning models. In certain embodiments, one or more of the modules 121-126 may also be performed using other means, such as using simultaneous localization and mapping (SLAM) by the trajectory tracking module 126.

In certain embodiments, the image perception module 120 may not include all the modules 121-126. For example, the face recognition module 121 may be important to identify the users, the eye tracking module 122 may be important to infer users' interests, the pose estimation module 125 and the trajectory tracking module 126 are important to predict the future locations of the user, but the image perception module 120 may not need to include the gender classifier 123 and the dress classifier 124.

In certain embodiments, the modules 121-126 are performed in parallel, so as to improve efficiency of the process. In certain embodiments, the content presentation application 118 may further includes a scheduler to arrange the capturing of the video stream and coordinate processing of the video by the modules 121-126. In certain embodiments, the face recognition module 121 may perform its function first so as to assign a face ID to each person in the video, and all the procedures performed by the modules 122-126 are lagged and the processing results are linked to the face IDs. In certain embodiments, the trajectory tracking module 126 is performed later than the performance of the pose estimation module 125, since trajectory tracking requires pose estimation result by the pose estimation module 125. In certain embodiments. the modules 121-126 is configured to process the video streaming in a real-time manner, and the processing results are sent to the offline profiling module 130.

In certain embodiments, each of the modules 121-126 may send their result directly to the offline profiling module 130, the device perception module 140, and the integration module 160. In certain embodiments, the modules 121-126 may not send out their result directly. Instead, the modules 121-126 may integrate their results based on face ID, and send the integrated result to the offline profiling module 130, the device perception module 140, and the integration module 160. The integrated result, which is also named image perception result, may include, for each person recognized in the video, face IDs, face locations, face features, eyes locations, eyes directions, objects the person are looking at, gender, dress types, dress colors, dress darkness (light or dark), moving intentions, current locations, and one or more future locations. In certain embodiments, part of the above information may be kept updating over time.

The offline profiling module 130 is configured to, upon receiving the image perception result from the image perception module 120, process the result to obtain an offline profile of the people in the video. In certain embodiments, the obtained offline profile is in form of offline vectors, and each offline vector may be indexed using a corresponding face ID. Each vector may include dimensions representing gender, age, interest, status, etc. of a user, and the vector is expandable. In certain embodiments, certain dimensions, such as interest, may have hundreds of attributes. For example, a person carrying a kid may be labeled with a specific interest attribute, such that a baby bottle advertisement may be provided targeting the person. In certain embodiments, certain dimensions such as gender, can be simply one value representing male or female, together with a confidence score. In certain embodiments, the offline vector is learned using a machine learning model, and the dimensions of the vector is linked to confidence scores indicating the reliability or possibility of the characters represented by the dimensions.

Figure 2B:
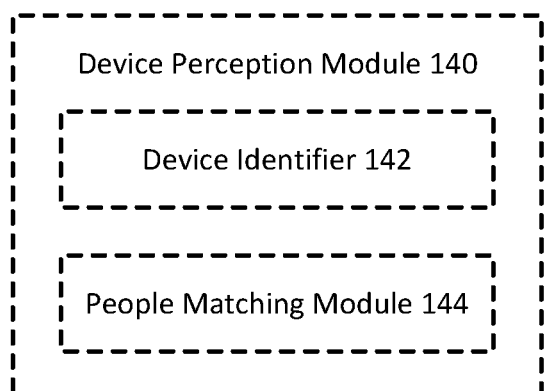
FIG. 2B schematically depicts a device perception module according to certain embodiments of the present disclosure.

In addition to the image perception module 120 provided to analyze people's appearance captured in the video, the device perception module 140 is provided to analyze device ID based on signals received from a device detector, such as a router 188 as shown in FIG. 3. Referring to FIG. 2B, the device perception module 140 includes a device identifier 142 and a people matching module 144. The device identifier 142 is configured to obtain device IDs, and the people matching module 144 is configured to match the device IDs with the people or face IDs.

The device identifier 142 is configured to, upon receiving detected router signals from the routers 188, filter the signal to obtain a list of devices with the device IDs, and send the filtered device list to the people matching module 144. The routers 188 preferably include multiple routers installed in the shopping environment. Each router 188 is able to scan or pickup devices nearby when the devices have their Wi-Fi settings turned on, and the scanned result includes device IDs and signal intensities of the devices. Since locations of the routers 188 are predetermined during installation, the device identifier 142 is able to estimate the location of the devices based on the intensity of the devices' Wi-Fi signal measured by the router 188. In certain embodiments, the device identifier 142 estimate the location of the device based on Wi-Fi signals between one device and several routers 188. Further, the pattern of the devices can also be analyzed. The pattern features may include when the devices are detected, how often the devices are detected, whether the devices are located in certain sites or whether the devices are moving. After obtaining the device IDs, the estimated device locations and the device patterns in a period of time, the device identifier 142 is further configured to filter the list of devices detected by the routers 188. The filtering process may be performed using certain criteria. For example, if a device is maintained at the same location for a very long time, such as days, it could be an equipment in the environment and is filtered out. If a device is shown with a pattern, such as coming to the environment several days a week in the morning or afternoon and leaving in the afternoon or evening, the device may be filtered out since the pattern shows that the person holding the device may be a staff in the environment, not a customer. By detecting and filtering, the device identifier 142 is configured to provide a list of devices with their device IDs, and the location of the devices at different times or at real-time.

The people matching module 144 is configured to, upon receiving the filtered list of devices with their IDs and locations from the device identifier 142 and image perception results from the image perception module 120, match the devices to the customers in the image perception results to obtain a matched list of device IDs and face IDs, and send the matched list to the online profiling module 150 and the integration module 160. In certain embodiments, the people matching module 144 is a machine learning model, and a confidence score may be determined for each of the matched device ID and face ID in the matched list. In certain embodiments, the matching process utilizes the customers' locations determined by the image perception module 120 and the locations of the devices determined by the device identifier 142. When the location of a customer and the location of a device is sufficiently close, the face ID and the device ID is matched. In certain embodiments, the people matching module 144 may matching the devices and the customers holding the device using data in a short period of time instead of a time point, so as to improve accuracy of the matching. In other words, if the moving of a customer is aligned with the moving of a device in a time period, the matching of the device to the customer is more reliable. In certain embodiments, the devices and the customer may not have exact match one on one, and the portion of the devices and the portion of the customers that do match form the matched list of face IDs and device IDs. In certain embodiments, the people matching module 144 may only need a part of the image perception result from the image perception module 120, such as the face ID and the trajectories (people's locations in a period of time), and there may be no need for the image perception module 120 to send the gender, the dress information, the pose, and the future location prediction to the people matching module 144.

The online profiling module 150 is configured to, upon receiving the matched list from the people matching module 144, mapping the device IDs to users in the online profile database 178, retrieve matched user profiles and generate online user profile vectors, and send the online user profile vectors to the integration module 160. Each of the generated online user profile vectors is linked with a device ID and a face ID in the matched list. The online profile database 178 includes users' online profile, for example a user's registered information such as age, gender, address and the user's shopping behavior for example derived from the customer's search history, purchasing history, as well as the devices used by the user for online shopping. When the online profiling module 150 determines that a device ID from the matched list matches a device used by a user recorded in the online user profile database 178, the online profiling module 150 is configured to retrieve the user's online profile, and generate an online profile vector based on the user's online profile. The generated online profile vector of the user may include the information of gender, age, interest, etc. In certain embodiments, the generated online user profile may not be in the form of vector, but can also be in other formats.

The integration module 160 is configured to, upon receiving the offline profile vectors from the offline profiling module 130, online profile vectors from the online profiling module 150, and image perception result from the image perception module 120, integrate the information together to obtain integrated user profiles, and send the integrated user profiles to the display module 170. In certain embodiments, the integration module 160 may only need to receive part of the image perception result from the image perception module 120, that is, the people's current locations and future locations from the trajectory tracking module 126. The integration include combining the offline user profile vector and the online user profile vector to form a user profile vector if they have the same face ID. For the same dimension in the offline vector and online vector, the confidence score of the dimension is considered, and the integration module 160 may keep the value of the dimension with a higher confidence score, and discard the value of the dimension with a lower confidence score. In certain embodiments, the value of a user profile vector dimension may be a weighted sum of that from the offline user profile vector and the online user profile vector. In certain embodiments, the treatment for one dimension may be different from another dimension. After processing by the integration module 160, the integrated user profiles may include face IDs, device IDs, user profile vectors, and current and future locations of the persons in the 2D map. In certain embodiment, the face IDs, the device IDs, and optionally the current and future locations of the persons may also be included as dimensions of the user profile vector. In certain embodiments, if a face ID does not have a corresponding device ID, the face ID, the offline user profile vector, and trajectory tracking (the current and future locations) of the people may still be kept for further use since we have that user's information based on the video. Accordingly, the integrated user profile may include entries that have face ID, device ID, user profile vector (the combined online user profile and offline profile), user trajectories, and entries that have face ID, offline user profile vector, and user trajectories.

Figure 2C:
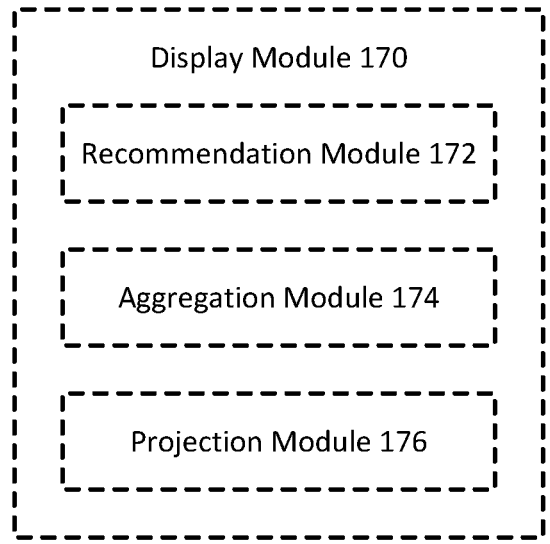
FIG. 2C schematically depicts a display module according to certain embodiments of the present disclosure.

The display module 170 is configured to, upon receiving the integrated user profile from the integration module 160, check contents from the contend database 179, recommend contents to be displayed, retrieve and aggregate the recommended contents, and display the aggregated content on the display devices 190. As shown in FIG. 2C, the display module 170 includes a recommendation module 172, an aggregation module 174, and a projection module 176.

The recommendation module 172 is configured to, upon receiving the integrated user profile, recommend a list of contents for each user, and send the lists of contents to the aggregation module 174. The content may include advertisement, public service announcement, etc. At first, the recommendation module 172 is configured to, for each integrated user profile, compare the user profile vector against the contents in the content database 179, and provide a content rank list that the user may be interested in. Each content in the content rank list is measured with a relevance score, indicating the likelihood of interest that the user may have toward the content. In certain embodiments, the recommendation module 172 uses collaborative filtering to obtain the rank lists for recommendation. After obtaining the content rank lists for the users identified in the integrated user profile, the recommendation module 172 is then configured to send the content rank lists to the aggregation module 174.

The aggregation module 174 is configured to, upon receiving the integrated user profile and the content rank lists, obtain an aggregated contents for each display device 190 at a predetermined future time period, and send the aggregated contents to the projection module 176. Specifically, for a display device 190 at the predetermined future time period, the aggregation module 174 is firstly configured to determine customers that are predicted to be in the display area of the display device 190. Each of these customers has his own content rank list. The aggregation module 174 is then configured to combine the content rank lists of the customers to obtain a content display list and provide a play sequence for the content display list. Subsequently, the aggregation module 174 is configured to retrieve the contents that are listed in the content display list from the content database 179. With the above data available, the aggregation module 174 is further configured to aggregate the content display list, the play sequence, and the retrieved contents into an aggregated content, and send the aggregated content to the projection module 176.

Figures 4, 5:
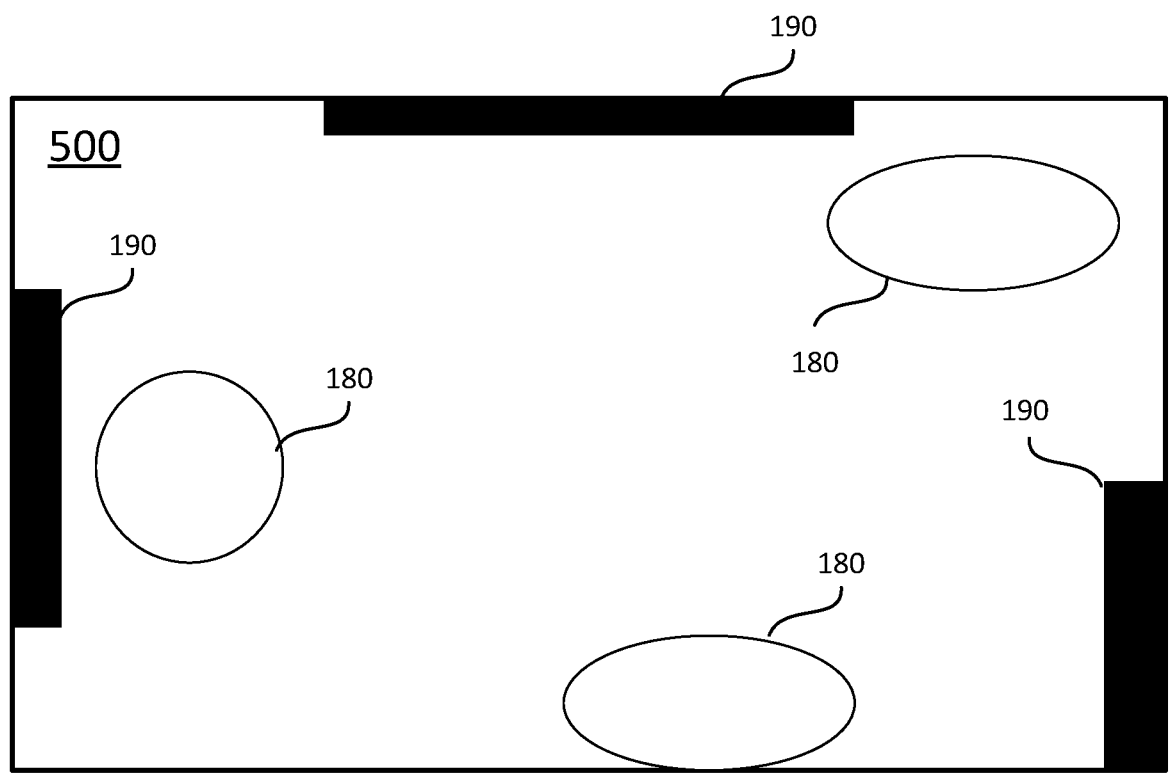
FIG. 4 schematically depicts confidential scores of users to different advertisements according to certain embodiments of the present disclosure.
FIG. 5 schematically shows a shopping environment with perception devices and display devices according to certain embodiments of the present disclosure.

FIG. 4 schematically shows content ranking list of customers audience according to certain embodiments of the present disclosure. As shown in FIG. 4, each of the customers, user 1, user 2, and user 3 has a relevance score in regard to each of the advertisement 1-4. In certain embodiments, the relevance score is the same as or closely related to a value of an interest dimension of the user profile vector, where the interest corresponds to the content of the advertisement. For a specific display device 190, when it is determined that in the next predetermined time period, such as the next 10 minutes, user 1 and user 3 will be in the display area of the display device 190, then the interests of the user 1 and user 3 are considered. In a simple integration model, the relevance values are added. Therefore, for Ads 1, the integrated relevance score is 0.8 (0.1+0.7); for Ads 2, the integrated relevance score is 0.3 (0.2+0.1); for Ads 3, the integrated relevance score is 0.45 (0.3+0.15); for Ads 4, the integrated relevance score is 0.7 (0.4+0.3). In certain embodiments, the integration of the relevance scores may also be performed using machine learning. In certain embodiments, according to the integrated score, the Ads 1 is displayed in the next 10 minutes such that the user 1 and user 3 can view the Ads that is highly interested by both. In certain embodiments, the integrated scores 0.8, 0.3, 0.45, and 0.7 are normalized to 36%, 13%, 20% and 31%, and the next 10 minutes is distributed to the four advertisements based on the normalized percentage and the length of the Ads.

In certain embodiments, the aggregation module 174 may revise the display lists based on the dynamic change of the customers in the display areas. For example, in the next 10 minutes, because the trajectory of the customers may be determined in a 30 second interval, the current and future locations of the customers may change over time, and the update of the display list would affect the advertisement being displayed at real-time. In certain embodiments, the aggregation module 174 may make the prediction of the display list for the next 10 minutes, and there is no need to change the display list at the next 10 minutes.

The projection module 176 is configured to, upon receiving the aggregated content list, display the retrieved contents on the display device 190 in the predetermined future time period based on the play sequence of the display list.

The online user profile database 178 may be stored in the storage device 116 or stored in a server of an e-commerce platform. The online user profile database 178 is typically configured to store registration information and purchase behavior of the user, for example, the gender, age, address of the user, the search preference and search history of the user, the purchase history of the user, and optionally the user's review, comment and post on the e-commerce platform, etc.

The content database 179 stores content for display, such as advertisement in a media form. The content may be updated regularly or when needed. The content database 179 is stored in the storage device 116 in the embodiment shown in FIG. 1. However, the content database 179 may also be stored online and is accessible to the content presentation application 118, or be directly stored in the display device 190. Although the display device 190 may have a limited storage capacity, we can store a sufficient number of new advertisement in the display device for the content presentation application 118 to choose from, and regularly update the stored advertisements.

Referring back to FIG. 3, the perception device 180 includes an imaging device 182, a LIDAR 184, a radar 186 and a router 188. The imaging device 180 may include multiple cameras to cover the shopping area. In certain embodiments, low or average resolution cameras are installed in a sufficient intensity in the shopping area and their captured images are used for face recognition, gender classification, dressing classification, pose estimation, and trajectory tracking, and high resolution cameras are installed close to the display 190 or other significant objects in the shopping area, and their captured images are used not only for the above described functions, but also for eye tracking. The LIDAR 184 and the radar 186 may be optional, and they can be used for accurate location determination and compensate the functions of the imaging device 182. In certain embodiments, the LIDAR 184 and the radar 186 may be only set at a few important places in the environment, such as the entrance, the exit, and the center stage of the environment. The router 188 is used to communicate with devices in the shopping environment, and the number of the routers 188 should also be sufficient to cover a significant portion of the shopping environment. In certain embodiments, the router 188 may also be replaced with other equipment that can be used to detect devices, especially the handhold devices by the users.

The display devices 190 may include TVs, monitors, billboard, or even audio device that are configured to show or broadcast content, such as media advertisements. In certain embodiments, the display device 190 may be controlled by a central controller, such as the computing device 110, to show the advertisement in a timely manner.

In certain embodiments, the system 100 is an internet of things (IoT) system.

FIG. 5 schematically shows a shopping environment 500 according to certain embodiments of the disclosure, where the perception devices 180 and the display devices 190 are arranged in different areas of the environment.

The network 195 is a communication network between the computing device 110, the perception devices 180, and the display devices 190. In certain embodiments, the network 195 may include wired or wireless network, and may be in the form of a mobile communication network, the Internet, the local area network (LAN), the wide area network (WAN), or a personal area network (PAN). The mobile communication network is a radio network system distributed over land areas called cells, and generally includes GSM, GPRS, HSPA, CDMA, WCDMA, WiMAX, LTE, satellite communication and many other mobile network systems. The PAN is a computer network system used for communication among computerized devices, which includes Wi-Fi, Zigbee, and Bluetooth networks. In certain embodiments, the network 195 is a cloud network.

As described above, some or all the functions of the face recognition module 121, the eye tracking module 122, the gender classifier 123, the dress classifier 124, the pose estimation module 125, the trajectory tracking module 126, the people matching module 144, the offline profiling module 130 and the recommendation module 172 utilize machine learning models, which automates the process and makes the process efficient and ensures the results are accurate.

Further, by incorporating eye tracking into the content presentation application 118, people's interest are predicted with high reliability. It is also novel to use machine learning for eye tracking.

Furthermore, matching the detected devices to the people recognized from the video is challenging, and certain embodiments of the present disclosure train a machine learning model with specifically labeled training data and considering distance or location as an important factor, and successfully implemented the matching process.

Most importantly, certain embodiments of the present disclosure consider both online user profile based on their online behavior and the offline user profile based on their appearance in the shopping area, target the audience based on their predicted trajectory, and increase the value of the displayed advertisement.

Kindly note audience, customers, and users may be used in the context, and may refer to the same population of persons that are present in the shopping environment such as a mall, and those persons are recognizable from the video of the shopping environments and/or the devices they hold.

Figure 6:
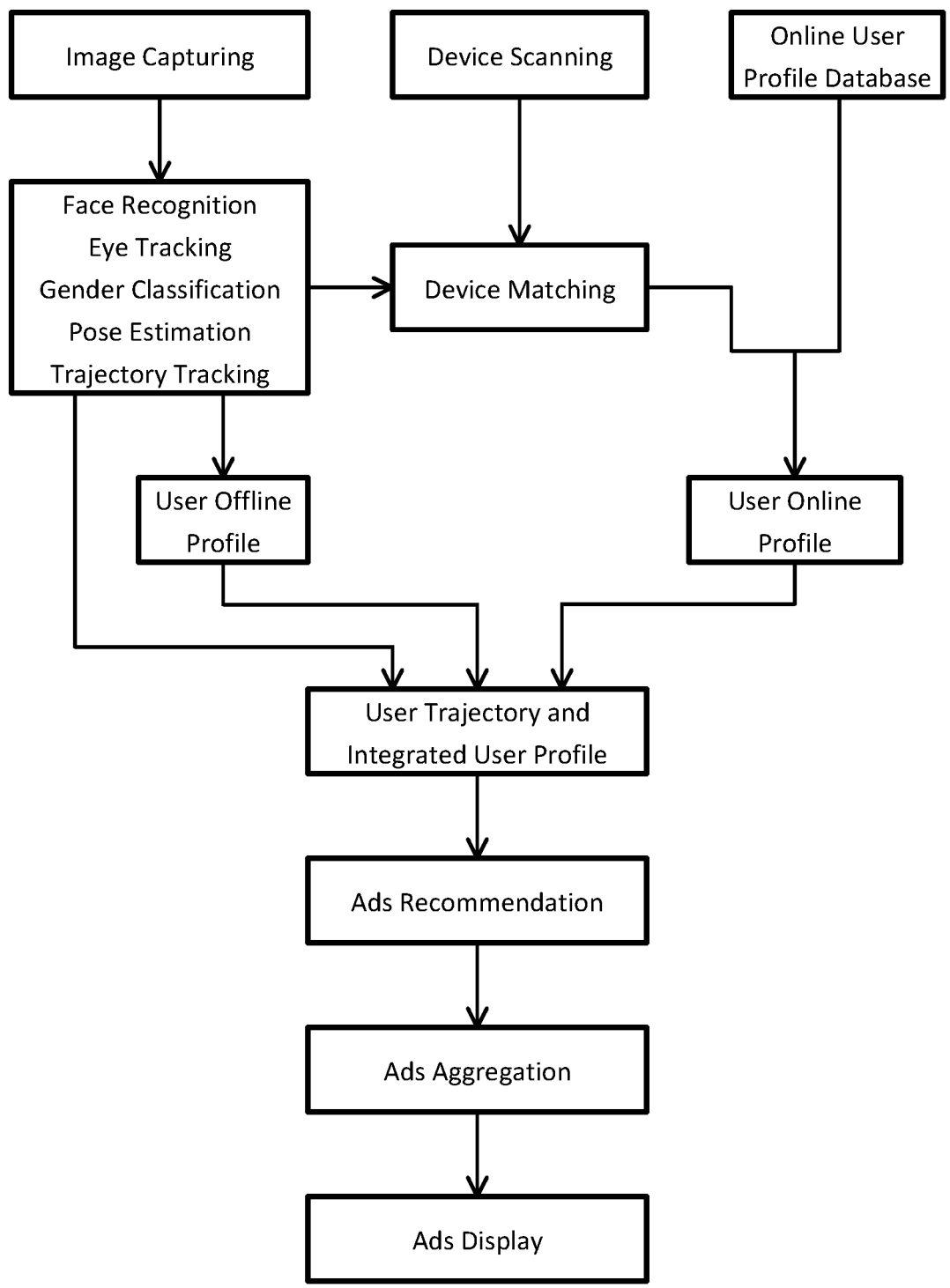
FIG. 6 schematically depicts a workflow of content presentation according to further embodiments of the disclosure.

FIG. 6 shows a workflow 600 according to certain embodiments of the disclosure. In certain embodiments, the workflow is implemented by the computing device 110 shown in FIG. 1. Referring to FIG. 6, the imaging devices 182 captures images, and the captured images is subject to face recognition, eye tracking, gender classification, pose estimation and trajectory tracking by the image perception module 120. The result of the image perception module 120 is further processed to form user offline profile.

The router 188 scans devices in the shopping environment, and the device matching perception module 140 matches the scanned device with the image perception result, so as to find people in the captured images that also holds a device. Using the ID of the matched device, the user's online profile can be retrieved if available from the online user profile database.

When both the offline profile and the online profile of the users are available, the integration module 160 combines the offline user profile and the online user profile to form combined or integrated user profile, and links the integrated user profile with the trajectory of the users. Based on the trajectory of the users, the users in the display area of the display device 190 is predicted. Based on the integrated user profile for the users that would be in the display area, one or more advertisements can be recommended. Those recommended advertisement can be aggregated and set to display in the display device 190. Accordingly, when the predetermined time comes, the display device 190 displays the aggregated advertisements, and the users interested in those advertisements are likely in the display area.

Figure 7:
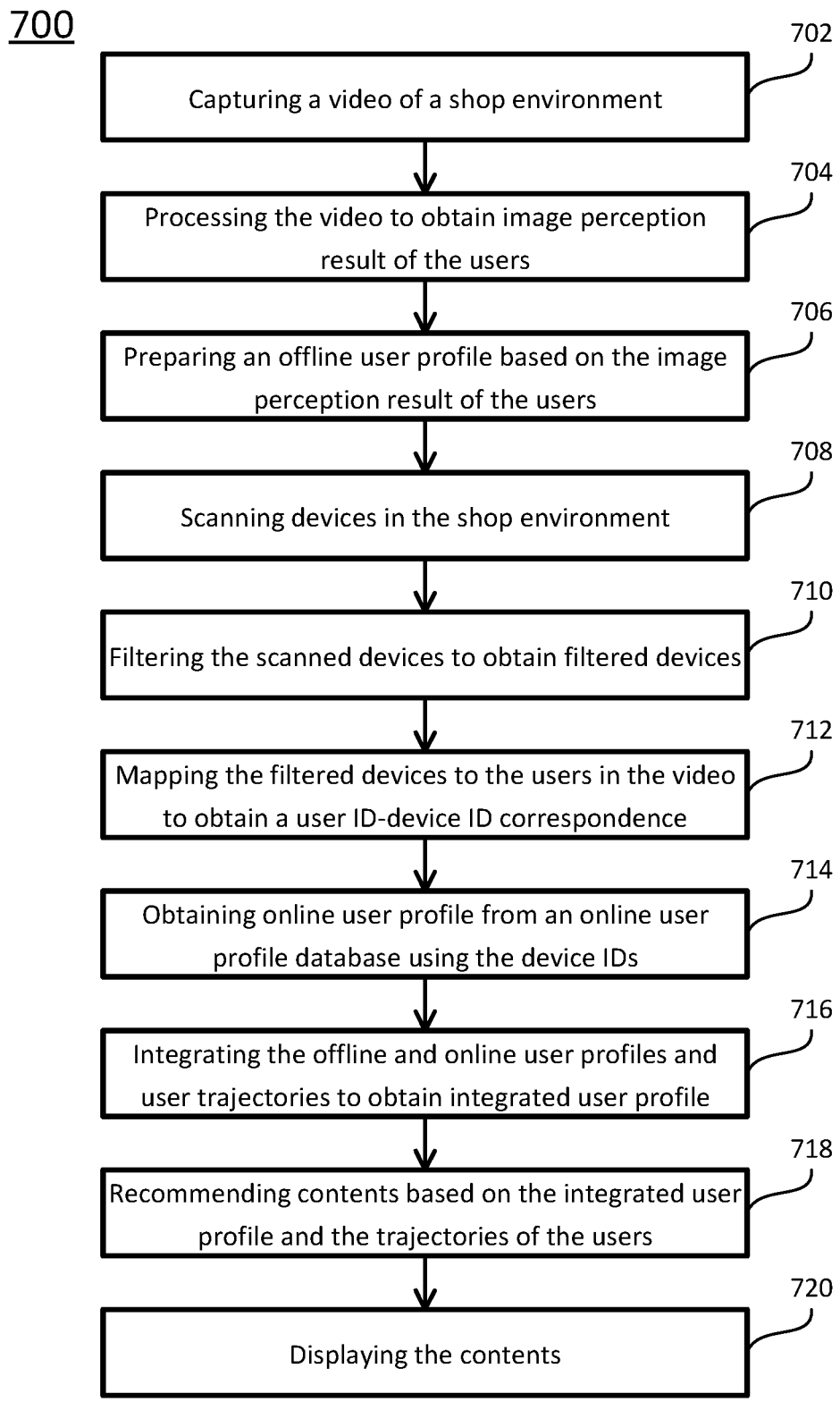
FIG. 7 schematically depicts a method for content presentation according to certain embodiments of the present disclosure.

FIG. 7 schematically depicts a method for content presentation according to certain embodiments of the present disclosure. In certain embodiments, the method is implemented by the computing device 110 shown in FIG. 1. It should be particularly noted that, unless otherwise stated in the present disclosure, the steps of the method may be arranged in a different sequential order, and are thus not limited to the sequential order as shown in FIG. 7.

As shown in FIG. 7, at procedure 702, the imaging device 182 captures a video of the shopping environment, and send the captured video to the image perception module 120. In certain embodiments, the environment may also be another type of environment in which a lot of customers present.

At procedure 704, upon receiving the video, the image perception module 120 processes the video to obtain image perception result (user features and user trajectory) of the users, sends the image perception result to the offline profiling module 130, the device perception module 140, and the integration module 160. In certain embodiments, the image perception results include features of the users such as face ID, eye tracking, gender, dress, pose, as well as current and future locations of the customers.

At procedure 706, upon receiving the features of the users, the offline profiling module 130 calculates an offline vector to represent the user's profile and sends the offline vector to the integration module 160. The dimensions of the offline vector may represent gender, age, interest, status (pose) of the user. Each feature may be represented by one or more dimensions. For example, the interest of the users may include multiple dimensions, and each dimension may correspond to the interest to a category of products. In certain embodiments, the image perception result sent to the offline profiling module 130 may not need to include trajectories of the users.

At procedure 708, the routers 188 scan devices in the shopping environment at different times to obtain lists of device IDs, and sends the lists of device IDs at different times, together with the signal intensities, to the device identifier 142.

At procedure 710, in response to receiving the lists of device IDs at different times from different routers 188, the device identifier 142 filters out certain devices, and sends the lists of filtered device IDs to the people matching module 144. In certain embodiments, the filtering process may include removing the devices that are stayed in one place for days, and removing the devices that are coming and go regularly with specified patterns, such as a device presents in a store every morning at 9 am, stays at the store most of the daytime, and leaves the store at 8 pm. The former may indicate an equipment device, and the latter may indicate a salesperson in the store. In certain embodiments, one device may be detected by multiple routers 188 with different detected signal intensity. The information may also be stored in the list of the filtered device IDs.

At procedure 712, in response to receiving the image perception result from the image perception module 120 and the filtered lists of device IDs, the people matching module 144 maps the filtered lists of device IDs to the customers recognized in the video to obtain a linked table between the face IDs and the device IDs, and sends the face ID-device ID link table to the online profiling module 150. Specifically, based on the locations of the routers 188 that communicate with one of the devices and the intensity of the signals the routers 188 receive in regard to the device, the location of the device can be calculated. In certain embodiments, when the locations of the device at different time points are calculated and optimized, the locations of the device at any time point can be estimated more accurately. At the same time, the image perception results include identification of the customers by their face ID and locations of the customers at different time points. Comparing the dynamic locations of the devices and the dynamic locations of the customers, the devices can be mapped to the users. In other words, a device ID in the filtered device list may be linked to a specific face ID.

At procedure 714, upon receiving the face ID-device ID link table, the online profiling module 150 queries the online user profile database 178 to obtain online user profiles corresponding to the device IDs that are listed in the face ID-device ID link table, and sends the retrieved online user profile to the integration module 160.

At procedure 716, upon receiving the image perception result from the image perception module 120, the offline user profile from the offline profiling module 130, the online user profile from the online profiling module 150, the integration module 160 integrates the information to obtain integrated user profile, and sends the integrated user profile to the display module 170. The integrated user profile includes information of the online and offline user profiles and the trajectories of the users.

At procedure 718, upon receiving the integrated user profile, the display module 170 recommends one or more contents from the content database 179 for each user based on the integrated user profile.

At procedure 720, the display module 170 further aggregate a display list of the contents for a specific display device 190 at a specific future time based on the recommended list for the users and trajectories of the users, and display the contents in the specific display device 190.

In certain embodiments, instead of data flow from one of the modules to another, the content presentation application 118 may include a scheduler to coordinates the above steps. The scheduler may load the video and scanned device information into the memory 114, and stores inputs and outputs of the modules at a same place.

In another aspect, the present disclosure relates to a non-transitory computer readable medium storing computer executable code. The code, when executed at a processor of a computing device, may perform the method 700 as described above. In certain embodiments, the non-transitory computer readable medium may include, but not limited to, any physical or virtual storage media. In certain embodiments, the non-transitory computer readable medium may be implemented as the storage device 116 of the computing device 110 as shown in FIG. 1.

In summary, certain embodiments of the present disclosure provide an interactive multiple perception display system. The system utilizes both offline user profile and online user profile so as to provide targeted contents. The offline user profile is based on real time video of the environment. The online user profile is retrieved from a user profile databased at an e-commerce platform. The online user profile is based on the users' online behavior, and the retrieval of the online user profile is based on the devices detected in the environment.

To detect user's interest in the offline user profile more accurately, eye tracking is used, and the eye tracking may be performed using machine learning.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for content display, comprising:
   capturing, by an imaging device, a plurality of images of an offline environment;
   processing, by a computing device, the plurality of images to obtain image perception results of users in the offline environment recognized in the images;
   generating, by the computing device, first user profiles based on appearance of the users, wherein the first user profiles are offline profiles, and the generating includes generating the first user profiles based on the image perception results of users, wherein the image perception results of each of the users comprises at least a face identification;
   detecting devices in the offline environment and associating the detected devices to the users to obtain associated devices that are held by the users;
   matching identifications of the associated devices to identification of devices recorded in online profiles of the users in a database to obtain matched devices;
   retrieving, by the computing device, second user profiles of the users based on the identifications of the associated devices, wherein the second user profiles are online profiles corresponding to the matched devices;
   integrating, by the computing device, the first user profiles and the second user profiles to obtain integrated user profiles;
   selecting, by the computing device, at least one content based on the integrated user profiles; and
   displaying, by a display device, the at least one selected content.

2. The method of claim 1, wherein the step of generating the first user profile comprises:
   extracting eye tracking features of the users from the images; and
   determining the users' interest based on the eye tracking features,
   wherein the step of selecting the at least one content is based on the user's interest.

3. The method of claim 2, wherein the eye tracking features comprise: locations of eyes, directions the eyes are aiming toward, and objects the eyes are looking at.

4. The method of claim 1, wherein the image perception results are obtained based at least on the appearance of the users, and the appearance of each of the users comprises at least one of: face feature, eye tracking feature, gender, dress feature, pose, or trajectory of the users;
   wherein the face feature comprises locations of faces in the images and characters of the faces, the eye tracking feature comprises locations of eyes, directions the eyes are aiming toward, and objects the eyes are looking at, the gender comprises male and female, the dress feature comprises dress type and dress color, the pose comprises the users' status of walking, running and standing, and the trajectory comprises current locations and predicted future locations of the users.

5. The method of claim 1, further comprising, before the step of associating the detected devices to the users: filtering out the detected devices that are stationary or move in a regular pattern.

6. The method of claim 1, wherein the first user profiles comprises current locations and predicted future locations of the users based on the images.

7. The method of claim 6, wherein the step of selecting at least one content comprises:
calculating a relevance score between each of a plurality of contents and each of the users; and
choosing the at least one content from the plurality of contents based on the relevance scores and the future locations of the users to obtain the selected at least one content.

8. The method of claim 1, wherein each of the users is assigned with a user face identification (ID).

9. The method of claim 1, further comprising: detecting locations of the users in the environment using at least one of a light detection and ranging (LIDAR) device and a radar.

10. The method of claim 1, wherein obtaining of the associated devices that are held by the users includes filtering, by the computing device, the detected devices to obtain filtered devices with device identifications, and mapping, by the computing device, the filtered devices to the users to obtain a face identification and device identification link table, and
wherein the retrieving the second profiles of the users includes retrieving, by the computing device, second user profiles of the users corresponding to the device identifications in the face identification and device identification link table.

11. A system for content display, the system comprising a computing device, the computing device comprising a processor and a storage device storing computer executable code, wherein the computer executable code, when executed at the processor, is configured to:
process a plurality of images, captured by an imaging device, to obtain image perception results of users in an offline environment recognized in the images;
generate first user profiles based on appearance of the users, wherein the first user profiles are offline profiles, and the generating includes generating the first user profiles based on the image perception results of users, wherein the image perception results of each of the users comprises at least a face identification;
associate devices detected in the environment to the users to obtain associated devices that are held by the users;
match identifications of the associated devices to identification of devices recorded in online profiles of the users in a database to obtain matched devices;
retrieve second user profiles of the users based on the identifications of the associated devices, wherein the second user profiles are online profiles corresponding to the matched devices;
integrate the first user profiles and the second user profiles to obtain integrated user profiles; and
select at least one content based on the integrated user profiles, so as to display the at least one selected content by a display device.

12. The system of claim 11, wherein the computer executable code is configured to generate the first user profiles by:
extracting eye tracking features of the users from the images; and
determining the users' interest based on the eye tracking features,
wherein the step of selecting the at least one content is based on the user's interest.

13. The system of claim 12, wherein the eye tracking features-comprise:
locations of eyes, directions the eyes are aiming toward, and objects the eyes are looking at.

14. The system of claim 11,
wherein the image perception results are obtained based at least on the appearance of the users, and the appearance of each of the users comprises at least one of: face feature, eye tracking feature, gender, dress feature, pose, or trajectory of the users;
wherein the face feature comprises locations of faces in the images and characters of the faces, the eye tracking feature comprises locations of eyes, directions the eyes aiming toward, and objects the eyes looking at, the gender comprises male and female, the dress feature comprises dress type and dress color, the pose comprises the users' status of walking, running and standing, and the trajectory comprises current locations and predicted future locations of the users.

15. The system of claim 11, wherein the first user profiles comprises current locations and predicted future locations of the users based on the images.

16. The system of claim 15, wherein the computer executable code is configured to select at least one content by:
calculating a relevance score between each of a plurality of contents and each of the users; and
choosing the at least one content from the plurality of contents based on the relevance scores and the future locations of the users to obtain the selected at least one content.

17. A non-transitory computer readable medium storing computer executable code, wherein the computer executable code, when executed at a processor of a computing device, is configured to:
process a plurality of images, captured by an imaging device, to obtain image perception results of users in an offline environment recognized in the images;
generate first user profiles based on appearance of the users, wherein the first user profiles are offline profiles, and the generating includes generating the first user profiles based on the image perception results of users, wherein the image perception results of each of the users comprises at least a face identification;
associate devices detected in the environment to the users to obtain associated devices that are held by the users;
match identifications of the associated devices to identification of devices recorded in online profiles of the users in a database to obtain matched devices;
retrieve second user profiles of the users based on the identifications of the associated devices, wherein the second user profiles are online profiles corresponding to the matched devices;
integrate the first user profiles and the second user profiles to obtain integrated user profiles; and
select at least one content based on the integrated user profiles, so as to display the at least one selected content by a display device.

18. The non-transitory computer readable medium of claim 17, wherein the computer executable code is configured to generate the first user profile by:
extracting eye tracking features of the users from the images; and
determining the users' interest based on the eye tracking features, wherein the step of selecting the at least one content is based on the user's interest.

* * * * *